US006304892B1

(12) United States Patent
Bhoj et al.

(10) Patent No.: US 6,304,892 B1
(45) Date of Patent: Oct. 16, 2001

(54) MANAGEMENT SYSTEM FOR SELECTIVE DATA EXCHANGES ACROSS FEDERATED ENVIRONMENTS

(75) Inventors: Preeti N. Bhoj, Cupertino; Sharad Singhal, Belmont; Sailesh Chutani, Palo Alto, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/184,425

(22) Filed: Nov. 2, 1998

(51) Int. Cl.[7] .................................................. G06F 13/00
(52) U.S. Cl. ............................................................ 709/202
(58) Field of Search ................................ 705/1, 7, 8, 500; 709/211, 212, 200, 201, 202, 203, 223, 226, 240

(56) References Cited

U.S. PATENT DOCUMENTS 6,049,819 * 4/2000 Buckle et al. ....................... 709/202

* cited by examiner

Primary Examiner—Robert B. Harrell
(74) Attorney, Agent, or Firm—Thomas X. Li

(57) ABSTRACT

A service management system in a federated system having a first and a second independently administered data service systems is described. The service management system includes a service manager that provides selective management data of the second data service system to the first data service system in accordance with a predetermined service level agreement between the first and second data service systems without giving the first data service system complete access to the second data service system. A method of selectively providing management data from one independently administered data service system to another independently administered data service system is also described.

9 Claims, 10 Drawing Sheets

MANAGEMENT SYSTEM FOR SELECTIVE DATA EXCHANGES ACROSS FEDERATED ENVIRONMENTS

BACKGROUND OF THE INVENTION

1. Field of the Invention

The present invention pertains to data access network (e.g., Internet and/or Intranet) systems. More particularly, this invention relates to a management system for accessing selective management data from a number of independently administered data service systems.

2. Description of the Related Art

The rapid growth of the Internet, widespread use of the World Wide Web, and a trend toward deployment of broadband residential networks have led to the development of new services such as interactive shopping, home banking, and electronic commerce. These services are federated since the underlying service components (e.g., network, applications, etc.) span multiple independently administered control domains.

FIG. 1 shows a prior art data access network system 10. The data access network system 10 can be, for example, an Internet or Intranet system. As can be seen from FIG. 1, the data access network system 10 typically includes a data service system 13 which is typically an Internet/Intranet service provider (ISP) system. The data access network system 10 also includes remote Internet and Intranet systems 14–15 connected to the data service system 13. Each of the systems 13–15 is an independently administered system when each of the Internet and Intranet systems 14 and 15 may include a number of independently administered systems. The system administrator of one such system does not know the structure and configuration of another system.

The data service system 13 provides Internet or Intranet service to its user terminals (e.g., user terminal 11) via an interconnect network 12. The data service system 13 typically includes a number of functional servers, such as proxy servers, web servers, news servers, domain name servers, etc. (e.g., servers 13a though 13n in FIG. 2). Subscribers connect directly to the data service system 13 from their user terminals (e.g., personal computers, Macintoshes, Web terminals, etc.) via the interconnect network 12. The data service system 13 typically employs the Internet Protocol (IP) for data communication to and from various servers, as well as with the remote systems 14 and 15. The Transmission Control Protocol (TCP) operates above the IP layer and ensures reliable delivery of information to the content servers in the systems 13–15. The application protocols that operate above the TCP layer are specific to the applications being accessed by the subscribers. For example, the File Transfer Protocol (FTP) is used for file transfers and the Hyper Text Transport Protocol (HTTP) is used for web accesses.

When the data service system 13 tries to grow or expand its services, it may be necessary or desirable for the data service system 13 to outsource some of the services it provides. For example, it may be desirable for the data service system 13 to outsource its web services to another data service system (e.g., the data service system 18 in FIG. 2). There are a number of advantages for the data service system 13 to outsource its services. First, the data service system 13 can be maintained at a desirable size. Secondly, the data service system 13 can increase its services without increasing its system resources and maintenance. In addition, the data service system 13 can concentrate on other services while the data service system 18 can try to best perform the outsourced services. This allows each of the data service systems 13 and 18 to provide its own specialty while the user can receive the best of the two systems.

The federated system, however, causes problems in service and system management and maintenance because each data service system within the federated system is independently administered and the entire system spans multiple independently administered control domains. The system administrator of one control domain is not able to access another control domain to detect problems in that control domain, or to measure service performance of the other data service system unless the system administrator is given access to the other control domain. For example, as can be seen from FIG. 2, because each of the data service systems 13 and 18 is an independently administered system, the data service system 13 cannot have the service performance information of the data service system 18 unless the data service system 13 is given access to the resources of the data service system 18. Providing complete access to service system 18 may be undesirable to the system administrator of the data service system 18 as the data service system 18 may contain technology or trade secrets that the system administrator of the data service system 18 does not want to disclose to the data service system 13.

Existing management tools such as Openview from Hewlett-Packard Co., Tivoli from IBM Co., and Unicenter from Computer Associates Co. may be used in each of the data service systems. These tools do not permit partial access to management information in the independently administered data service systems in the federated system. Moreover, it is also difficult for the users of the federated system to validate that their service provider is meeting its obligations in the federated system. This thus makes it difficult to provide effective customer support for, for example, the data service system 13.

SUMMARY OF THE INVENTION

One feature of the present invention is to share selective system management information between various data service systems that are independently administered.

Another feature of the present invention is to allow selective sharing of information of a data service system with external sources without allowing the external sources to have complete access to the data service system.

A further feature of the present invention is to selectively provide management and/or measurement information of a data service system to an external source in accordance with a predetermined service agreement between the data service system and the external source.

A further feature of the present invention is to verify service level guarantees specified in a predetermined service level agreement and to provide access to the verification results to customers or other data service systems.

Described below is a service management system in a federated system having a first and a second independently administered data service systems. The service management system includes a service manager that provides selective measurement data of the second data service system to the first data service system in accordance with a predetermined service level agreement between the first and second data service systems without giving the first data service system complete access to the second data service system.

A method of selectively providing measurement data from one independently administered data service system to another independently administered data service system in a data access network system is also described. The method includes the step of identifying a predetermined service level agreement between the first and second data service systems when the first data service system receives a request for its management data from the second data service system. Then the first data service system selectively provides the management data to the second data service system in accordance with the predetermined service level agreement without giving the second data service system complete access to the first data service system.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
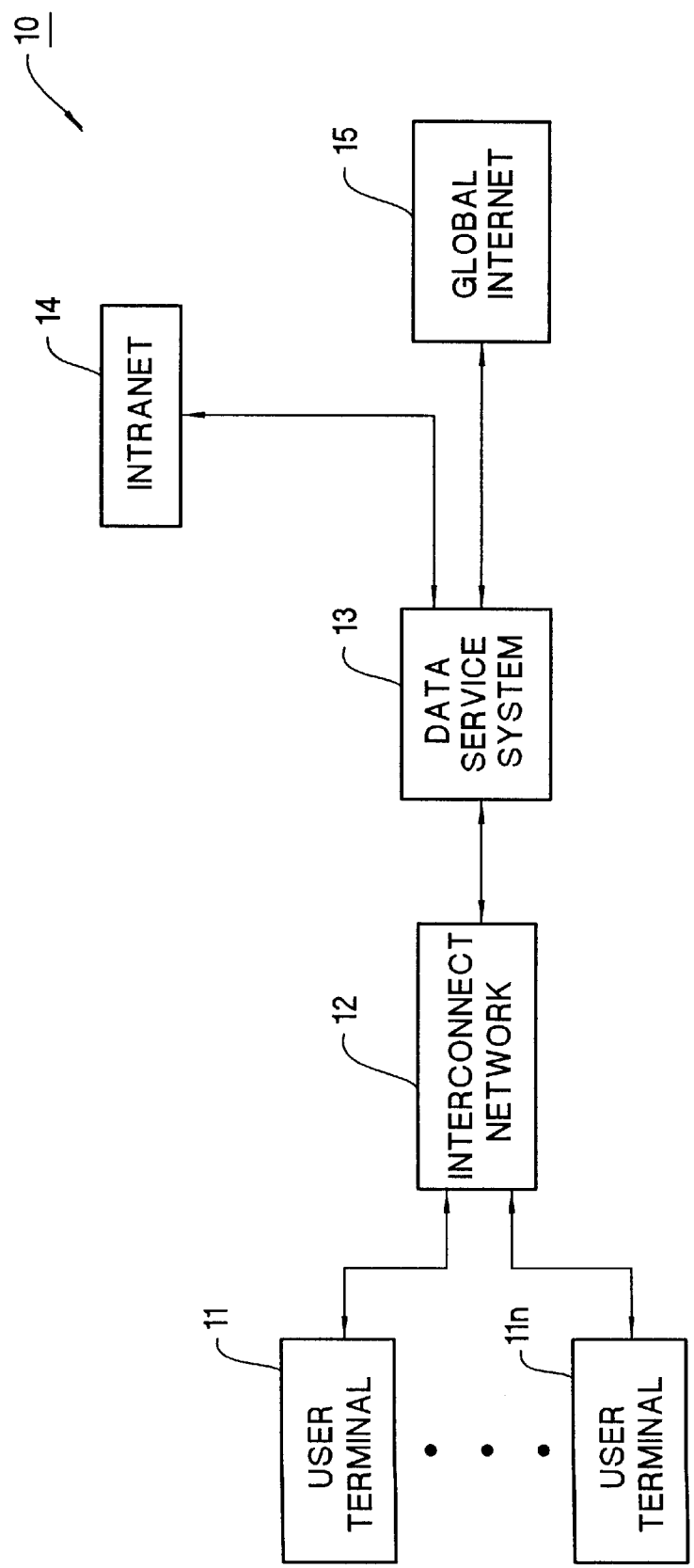
FIG. 1 shows a prior art data access network system.
Figure 2:
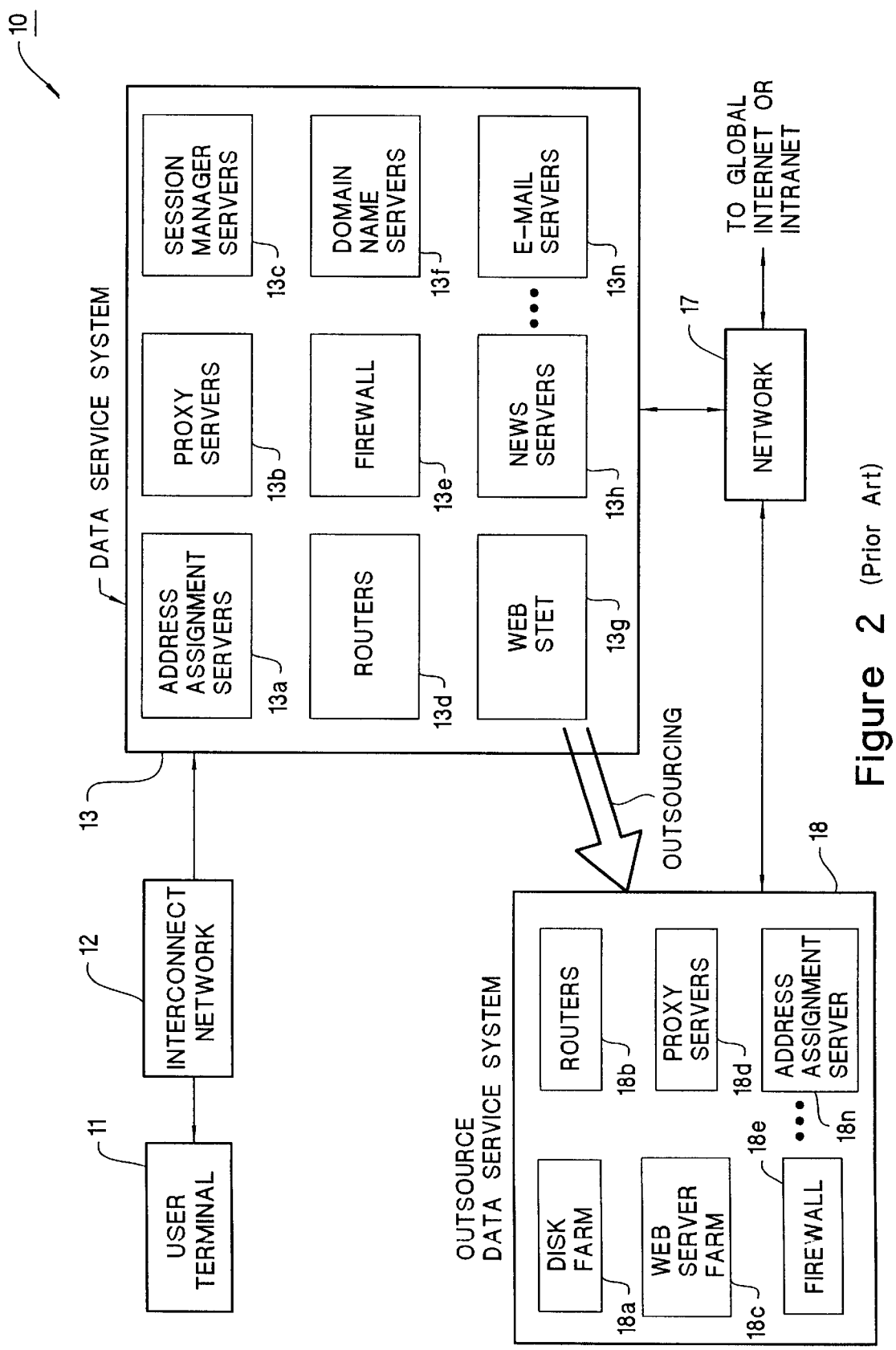
FIG. 2 shows a prior art scheme of outsourcing some services of the data service system of FIG. 1 to another data service system.
Figure 3:
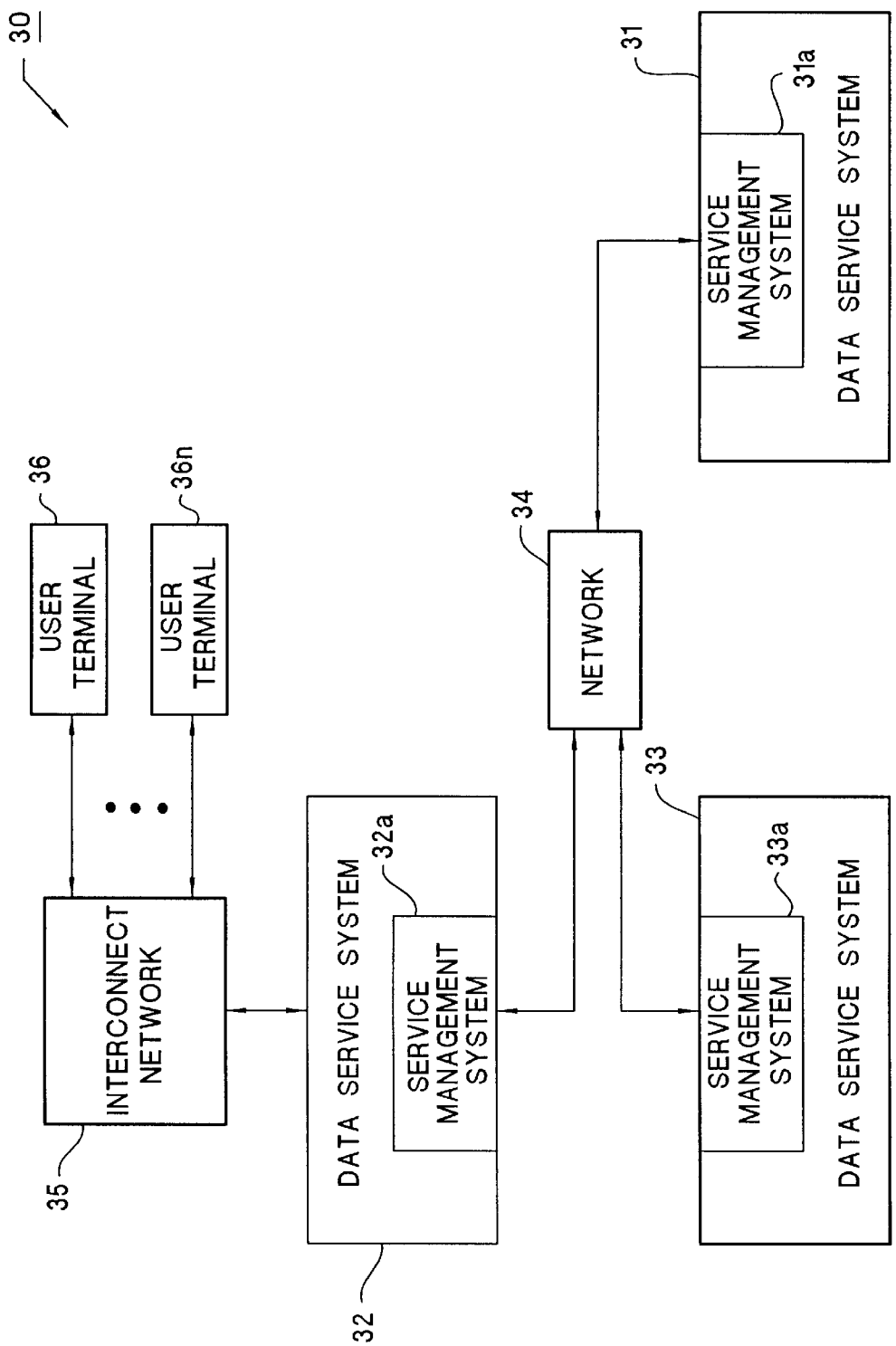
FIG. 3 shows a data access network system that includes a federated management system in accordance with one embodiment of the present invention, wherein the federated management system includes a number of service management systems, each in one of a number of data service systems of the data access system.

FIG. 3 shows a data access network system 30 that includes a number of data service systems (e.g., the data service systems 31–33) connected together via a network 34. Each of the data service systems 31–33 is a data service provider system and can also be referred to as a service provider system. Each of the data service systems 31–33 constitutes an independent administrative control domain. This means that each of the data service systems 31–33 is independently administered.

In addition, the data access network system 30 also includes a management system that implements one embodiment of the present invention. As will be described in more detail below, the management system is formed by a number of service management systems (i.e., the service management systems 31a–33a), each being located in one of the data service systems 31–33. Each of the service management systems 31a–33a can provide selective management data of the underlying data service system to another requesting service management system located in another data service system (or a customer or user terminal) in accordance with a predetermined service level agreement between the two domains without giving the requesting system complete access to the responding data service system. The management data of a data service system include both management and/or measurement data of the data service system.

This arrangement allows sharing of selective management information of independently administered systems securely in a federated environment. It also allows management of the services of the entire data access network system 30 (or part of it) without any one domain having complete access to each of the data service systems 31–33 of the data access network system 30. This also allows the data service systems 31–33 to exchange information about how a service provider is complying with its service level agreements with its customer, outsourcer, or partner. In addition, the arrangement enables the customers of the data access network system 30 to monitor and verify the delivered services against the guarantees offered by their service providers without having complete access to the service provider's system. The federated management system in accordance with the present invention will be described in more detail below.

As can be seen from FIG. 3 and as described above, the data access network system 30 is an infrastructure that spans multiple control or administrative domains. Thus, the data access network system 30 is a federated system. A federated system is a system composed of different administrative entities cooperating to provide a service or services. A service typically means an application with well defined interface and functionality. A control domain means an administrative domain that is managed by a single administrative entity.

As can be seen from FIG. 3, only three data service systems 31–33 are shown for the data access network system 30. This is for illustration purposes only. In practice, the data access network system 30 may include many more or fewer data service systems. Each of the data service systems 31a–33a is a functional module within its respective system. This means that each service management system can be run by one or more host computer systems within the respective data service system.

In one embodiment, the data access network system 30 is an Internet and/or Intranet system. In this case, each of the data service systems can be employed by an Internet/Intranet service provider to offer data (e.g., web) services to users or subscribers connected to the respective data service system. In addition, a data service system (e.g., the data service system 32) may outsource some of its services to another data service system (e.g., the data service system 31).

When the data access network system 30 is an Internet/Intranet enabled system, each of the data service systems 31–33 provides Internet-based or Intranet-based service to its respective subscribers. Thus, each of the data service systems 31–33 may be an online service system, such as America Online or Compuserve, a local Internet service system, or an Intranet service system. For the subscribers of the data service system 32, access to web content servers in the data service systems 31 and 33 can be regarded as two other services offered by the data service system 32.

Alternatively, the data access network system 30 can be another type of network system. For example, the data access network system 30 can be a workflow process system or an enterprise network system.

Figure 4:
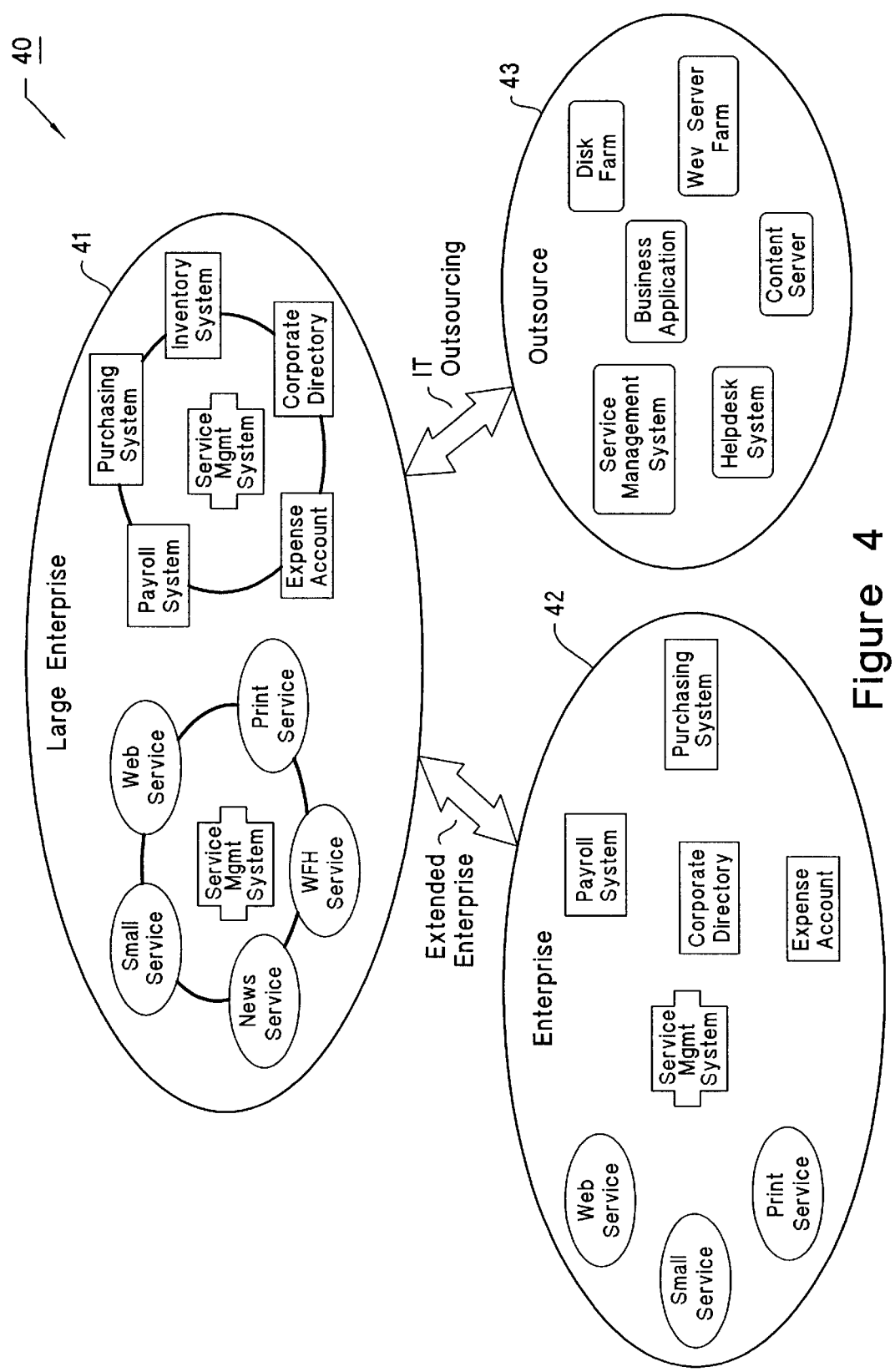
FIG. 4 shows one application of the data access system of FIG. 3.

FIG. 4 schematically illustrates one application or implementation of the data access network system 30 of FIG. 3. As can be seen from FIG. 4, the network system 40 includes a large enterprise system 41 connected to an extended enterprise system 42 and an outsourcer system 43. Each of the systems 41–43 is independently administered. Each of the systems 41–43 provides a number of services (e.g., payroll, accounting, web, printing, e-mail, etc.). Some of the services provided by the large enterprise system 41 are outsourced to the outsourcer system 43. The extended enterprise system 42 is the extension of the large enterprise system 41.

Referring back to FIG. 3, data communications among the data service systems 31–33 are conducted using one or more predetermined open standard communication protocol for Internet/Intranet communications. In one embodiment, the open standard communication protocol is the Hyper Text Transport Protocol (HTTP). Alternatively, other known open standard communication protocols for Internet/Intranet communications can also be used.

The data service system 32 is also connected to a number of user or subscriber terminals 36–36*n* via an interconnect or access network 35. The user terminals may be at the residences, schools, or offices of the users. Each of the user terminals (e.g., the terminal 36) includes a web browser (or other application software) that allows the user applications to access the data services offered by the data service system 32 when the data access network system 30 implements an Internet and/or Intranet system. FIG. 3 only shows that the data service system 32 is connected to the user terminals. This is for illustration purposes only. In practice, each of the data service systems 31 and 33 may also be connected to a number of user terminals.

Each of the user terminals 36–36*n* can be a personal computer, a network computer, a notebook computer, a workstation, a mainframe computer, a supercomputer, or any other type of data processing system. In addition, each user terminal may include a modem or a network adapter, depending on the network technology adopted for the interconnect network 35.

Each of the networks 34–35 can be any known network, such as Ethernet, ISDN (Integrated Services Digital Network) network, ADSL network, T-1 or T-3 link, cable or wireless LMDS network, telephone line network, or FDDI (Fiber Distributed Data Network) network. Alternatively, the networks 34 and 35 can be other known networks.

Because the data access network system 30 is a federated system that spans multiple control domains, each of the data service systems 31–33 is an independently administered control domain. This means that each of the data service systems 31–33 is managed and administered by a single operator or entity. However, when providing end-to-end service performance evaluation for such a networked system, the management information of the entire network system 30 needs to be shared by various administrative or control domains in order to give an end-to-end view. On the other hand, it may be necessary for a control domain to restrict information sharing across control domains because the details of the system and/or service implementation and much of the customer information is considered proprietary within a control domain.

In order to solve the above mentioned conflicts and to provide service guarantees to customers, service level agreements (SLAs) are used in the data access network system 30 to define agreements among the data service systems 31–33 to share resources, and to allow each of the data service systems 31–33 to offer service quality guarantees to their respective customers. As described above, each of the data service systems 31–33 may have agreements to share resources with other data service systems to provide complete services (i.e., outsourcing). In addition, each of the data service systems 31–33 may have agreements with its customers to offer service quality guarantees to the customers. A customer means an entity contracting with one of the data service systems 31–33 to have its content hosted in the respective data service system, or to have its services (e.g., e-commerce, e-mail, or news group) offered to users through the respective data service system.

These SLAs will contain (along with other obligations) details of information that will be shared among the data service systems 31–33. Here, all interactions between any two data service systems or between a data service system and its associated user terminals are based on bilateral agreements that are part of the SLAs. In addition, the SLAs will also detail the service level guarantees offered by the service providing systems. A SLA is typically written in humanly recognizable language as a binding document between parties. The components of a SLA includes the parties of the SLA, the service objectives of the SLA, the responsibilities of the parties, the problem management, the penalty clauses, and so on. Below is an example of a SLA.

The service provider introduces this service level agreement for its frame relay, dedicated 56 Kbps, T-1, T-3, and OC-3 Internet access services. This service level agreement is available for U.S. customers and U. S. customers purchasing leased line access in its multinational service program.

The service provider is guaranteeing:

(1) 100 percent availability of the backbone of the service provider as well as the customer access circuit ordered by the service provider;

(2) average monthly latency of no more than 85 millisecond (ms) round-trip within the service provider's backbone in the contiguous United States and of no more than 120 ms between New York and the service provider's international gateway hub in London;

(3) pro-active outage notification that guarantees customer notification by the service provider within 15 minutes of an outage; and (4) installation by a quoted install date, which will not be more than 40 business days for frame relay, 56 Kbps and T-1 customers and 60 business days for T-3 customers in the U.S.

If these conditions are not met, the service provider will automatically reimburse the customers accordingly. The service provider will give the affected customers a one-day credit of use for every hour or fraction thereof of downtime. If the service provider does not meet the latency guarantee for two consecutive months, the customers of all frame relay, dedicated 56 Kbps, T-1, T-3 and OC-3 are issued a credit of one day's service fee. If guaranteed installation intervals are not met, the service provider will give customers a credit for half of the installation service fee.

The SLAs are converted eventually into machine readable contract templates and stored in the service management systems of the respective data service systems 31–33. The stored contract templates are then used by the service management system in each of the data service systems 31–33 to control access to the system resources of the associated data service system and to monitor the system for compliance with the provisions of the SLAs. In other words, the SLAs define the details of which management data can be exposed and to whom. The service management systems 31a–33a allow monitoring and sharing of selective management information across control domain boundaries in a secure way in the data access network system 30.

This means that a SLA exists between any two data service systems in the data access network system 30. Note that a data service system may also choose to allow public or limited accesses to certain data without requiring an SLA. For example, there is a SLA between the data service systems 31 and 32 or between the data service system 32 and one of its user terminals 36–36n. When the data service system 32 needs to evaluate the service performance of the data service system 31, the service management system 32a sends a request to the service management system 31a. The service management system 31a then, in accordance with the SLA between the two data service systems, selectively sends some of the management data of the data service system 31 to the service management system 32a.

Each of the SLAs is first converted into a contract specification (also referred to as contract) in order to be stored in and used by the respective one of the service management systems 31a–33a. A contract specification is derived from a SLA to indicate the service attributes that are meaningful for correct service behavior. The contract specification contains both the service attributes and the bounds within which the service attributes must stay in order for the service to behave in a desired manner. Attributes must both be quantifiable and measurable to be included in a contract specification. The conversion from the SLA to the contract specification can be done, for example, by human being or using knowing language conversion technology. In one embodiment, the SLAs are converted into the corresponding contract specifications manually. In this case, the contract specifications are written using some kinds of source languages.

A contract specification is defined by the triple (P, M, A), where P is the set of properties associated with the contract, A is the set of assertions agreed upon by the parties, and M is the set of methods (or operations) available on the contract. Here, properties define information (needed for contract verification) that does not necessarily relate directly to the specific service that is the subject of the contract. Examples of items in P are P={authentication mechanism, access control, invocation methodology, . . . }.

Assertions contain service-related agreements or guarantees. An assertion is an atomic group of statements that is agreed upon by the parties defining the contract. At any given time, an assertion can take the logical value of TRUE or FALSE depending on whether the party is meeting the obligations stated in the assertion or not. Alternatively, an assertion may take multiple values. The following description will use the TRUE/FALSE logical values as an example.

Statements in an assertion are made up of logical predicates (i.e., logical expressions formed using system attributes, customer dependent variables, constants, and arithmetic and logical operators) whose truth value can be uniquely determined. The logical predicates are composed using variables as well as logical operators such as $\{\wedge, \vee, \neg\}$, quantifiers $\{\forall, \exists\}$, set operations $\{\in, \cup, \cap\}$, and constraints such as $\{\leq, \geq, \neq, =\}$ on these variables. Variables may be simple variables (e.g., current network load), statistical variables (e.g., averages or variances), or trends (time dependent variables such as growth rates). They reflect measurements that are meaningful for the operation of the service.

The assertion set A consists of $A=\{\mathcal{R}(v)\}$, where v is a vector of variables that reflect some aspect of the service and $\mathcal{R}$ (v) is a relationship that constrains those variables according to the contract agreements. At any given time, $\mathcal{R}$ (v) takes on the logical values TRUE or FALSE depending on whether the constraint described in the relationship is being met or not. Assertions describe the guarantees offered in the SLA. Examples of assertions in A may be A={network availability >99.9%, packet loss<2% $\wedge$ round trip delay<150ms, . . . }.

Methods describe the operations available on the contract during contract verification. Methods permit the invoker to query the truthfulness of the assertions in the contract, identify assertions that are FALSE, and retrieve the values of associated variables in the assertions. For example, M may consist of M={verify contract, query variable values, register constraint, notify when event occurs, . . . }.

An assertion is verifiable (computable) if explicit means exist to verify the truthfulness of the assertion at any given time. A contract is verifiable if all assertions within it are verifiable. A contract is compliant if all assertions within it are TRUE. This requires that all assertions in the contract should be verifiable and consistent. A contract is valid if there are no assertions within it that cannot take the TRUE value. Conversely, a contract is invalid if at least one assertion of the contract cannot be TRUE. An assertion (or the entire contract) is dependent on another assertion (or contract) if the value (or compliance) of the first depends on the value (or compliance) of the second. Two contracts are consistent if no dependencies exist such that the compliance of one forces non-compliance of the other. For a set of assertions to be consistent, it is required that no dependency exists within the set such that compliance of one assertion forces non-compliance in another.

A Contract Definition Language is used to specify the assertions in a contract in the form of a template that uses the attributes and thresholds as parameters. The contract definition language can be formal language such as UML (Unified Modeling Language). In addition, other system modeling languages can also be used. Below described is a declarative language with syntax similar to the C language which is used in one embodiment of the present invention to describe a contract specification in accordance with a predetermined SLA. A description of the grammar of the declarative language is shown below:

Contract
   :DeclarationList AssertionList [FilterList]
Declaration
   :ContractName|ServiceName|Variable Type Declarations
Assertion
   :PredicateList|AssertionLabel: PredicateList
Predicate
   :Assertion|expression
   |if (expression) predicate [else predicate]
Expression
   :unary and binary C expressions; constants; and identifiers
Identifier:
   system attribute name, user variable, constant, AssertionLabel
Filter
   :Event EventName FilterDescription EventValue |Status StatusVariable FilterDescription FilterDescription
:expression|if (expression) expression [else expression]
EventValue
:expression|if (expression) expression [else expression].

Declarations contain meta information about the contract as well as type specifications for variables used in the contract. The value of the contract is the logical AND of all assertion values. Assertions may optionally be given a label. If an assertion is labeled, it may be verified independently. Filters can be associated with a contract, and may be used to compute various kinds of status information (e.g., expected time to repair, trouble ticket information, etc.) about the contract and/or to generate events (e.g., notify operators when a contract is not met) when certain conditions are met. Filters and events are defined using a syntax similar to assertions, and can use any of the variables defined as part of the contract.

The creation of the contract specification also takes into consideration the service model of the corresponding data service system that offers the agreed data services. This means that customer dependent data and system dependent data that are derived from the service model information are used to create the contract specification.

A service model of a data service system describes the service implemented by the corresponding data service system as well as the dependencies between the service components within the data service system. The service model identifies the various components of the data service system that enable the service. For example, if the service being managed is electronic mail, the service model would list the components as the e-mail server host, the networks connecting the e-mail host to the Internet, the e-mail application itself, the name server used to resolve host names to Internet addresses, and so on. The service model also expresses interdependencies that exist among the different components of the service. From the above e-mail example, all components identified in the service model should function properly for the e-mail service to work. The interdependencies capture the cause and effect between the components of a service. The service model also identifies the measurements and metrics that are available from each component. Thus, the e-mail server could identify the number of e-mail transactions, and active measurements could be used to get an estimate of the response time seen by e-mail clients. Similar to the SLAs, a service model can also be written by human being using natural languages. It could also be written using formal languages such as CIM (Common Information Model) and ASN. 1 (Abstract Syntax Notation). As described above, a service model information includes customer dependent data and system dependent data.

The customer dependent data are customer-specific data that describe the guarantees (thresholds and bounds on the attributes) as well as the service components that impact the service offered to a given customer. The customer dependent data describe the abstract view of the service model in terms of high-level service attributes that are offered to customers. For example, the customer dependent data can specify that the guaranteed availability is equal to 99.9% and the premise router address is 15.25.0.0.

The system dependent data identify the attributes as well as meta data about the attributes. The data include which piece of the management data is used to obtain the attribute value, how often the measurements are made, what parameters are necessary to measure an attribute. For example, for a packet loss measurement, the attributes could specify that the packet loss measurement has a Time-To-Live (TTL) of 15 minutes, that it requires a network segment identification as a parameter, and that it should be obtained using the Network_Measures measurement means. The system dependent data allows the service management system to operate without the need to know the details of the underlying data service system.

Figure 9:
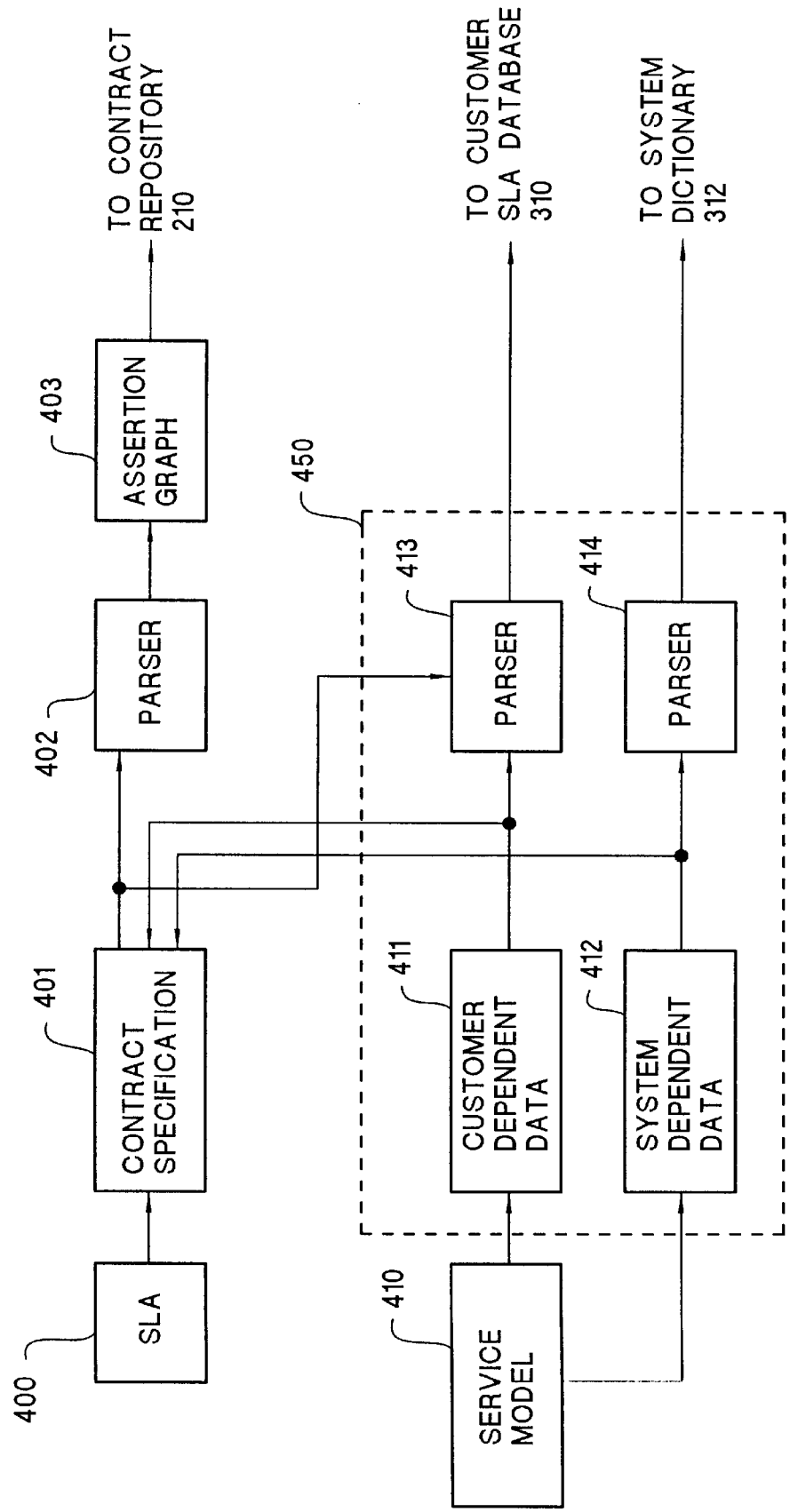
FIG. 9 is a diagram showing the process of converting the service level agreement and the service model into machine recognizable form.

The written contract is then compiled into, in the assertion graph structure, the contract template by a compiler or parser (shown in FIG. 9) in machine code form. FIG. 9 shows the conversion process of the SLA into the final assertion graph contract template in machine code form, which will be described in more detail below.

As can be seen from FIG. 9, a SLA 400 is first converted into a contract specification 401. This can be done by human being, for example. The contract specification 401 can be written, for example, by human being using the declarative language described above. The written contract specification 401 also takes into consideration customer dependent data 411 and system dependent data 412 when deriving the contract specification 401 from the SLA 400. The customer dependent data 411 and the system dependent data 412 are derived from the service model 410. As described above, the service model describes the service implemented by the corresponding data service system as well as the dependencies between the service components within the data service system.

In one embodiment, the customer dependent data 411 and the system dependent data 412 are derived from the service model 410 manually. In alternative embodiments, the customer dependent data 411 and the system dependent data 412 can be extracted from the customer dependent data 411 and the service model 410, respectively.

The contract specification 401 is fed to a parser 402 that compiles the contract specification 401 into machine code contract template 403 (i.e., assertion graph structure). The parser 462 can be implemented using any known software compiler or parser and the compilation process is also known to any person skilled in the art.

Likewise, each of the customer dependent data 411 and the system dependent data 412 are supplied to a parser (i.e., either parser 413 or parser 414) to convert the respective data into machine code form. Again the parsers 413–414 can be implemented using any known compiler or parser. The converted customer dependent data are then stored in a customer SLA database (to be described in more detail below) of the corresponding service management system. The converted system dependent data are then stored in a system dictionary (to be described in more detail below) of the corresponding service management system.

Referring back to FIG. 3, the compiled machine code contract template (e.g., the contract template 402 of FIG. 9) and the converted customer and system dependent data are then stored in the corresponding service management system, and are used by the corresponding service management system to provide the selective management data. This will be described in more detail below, also in conjunction with FIGS. 5–8 and 10. FIGS. 5–8 also show the structure and operation of each of the service management systems 31*a*–33*a*, which will also be described in more detail below.

Figure 5:
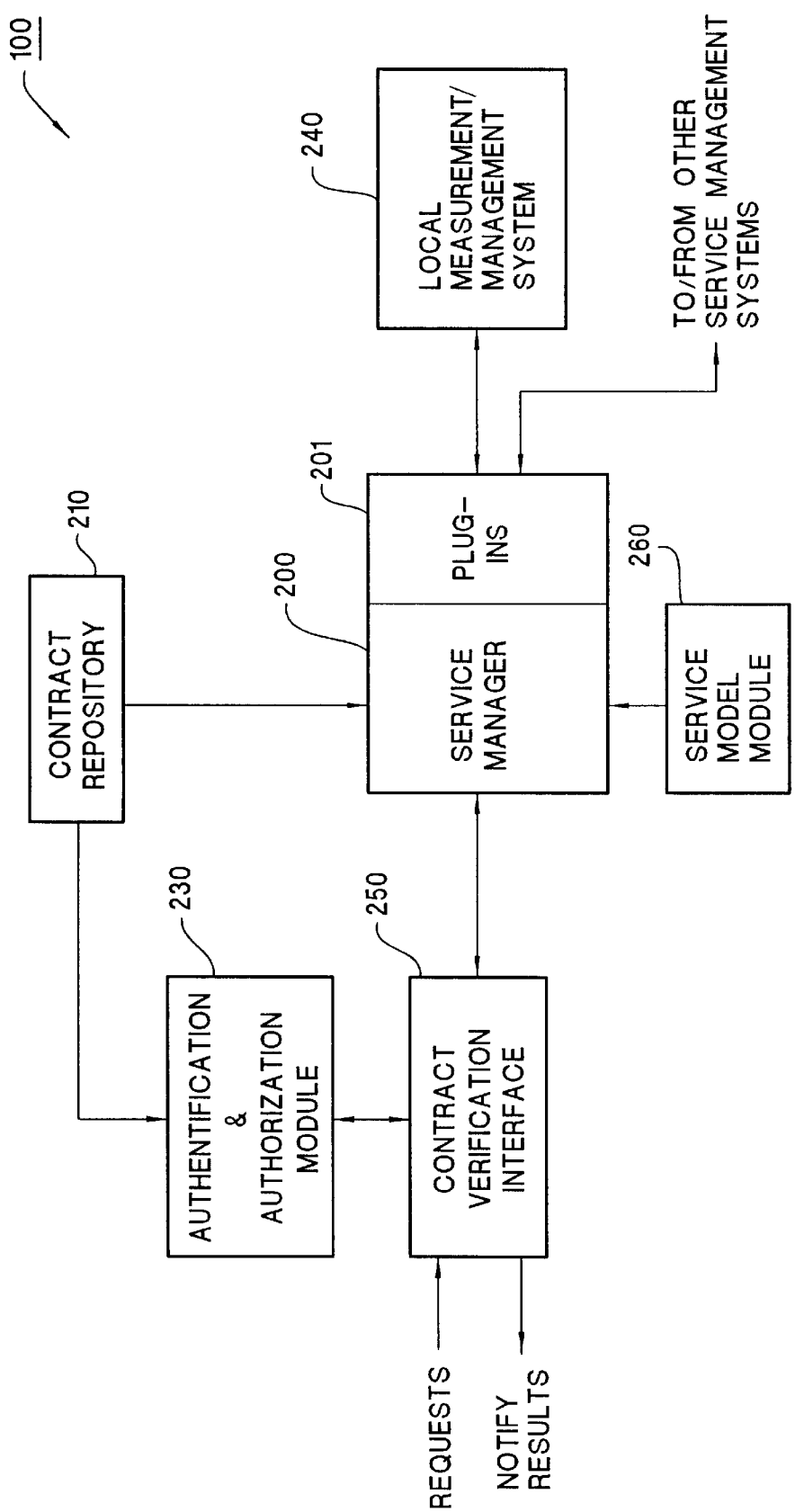
FIG. 5 shows in block diagram form the structure of the service management system that can be any one of the service management systems of FIG. 3.

Referring to FIG. 5, a service management system 100 is shown which can be any one of the service management systems 31*a*–33*a* of FIG. 3. The service management system 100 implements one embodiment of the present invention. The service management system 100 includes a service manager 200 that is the main engine of the service management system 100 responsible for directing the verification task (i.e., to generate the selective management data from all management data of the associated data service system in accordance with the predetermined service level agreement) using the stored contract templates.

The service manager 200 is connected to a contract repository 210 to receive the contract templates from the contract repository 210. The contract repository 210 functions as a database to store all the contract templates (e.g., the contract template 402 of FIG. 9) derived from their corresponding SLAs which the underlying data service system of this service management system 100 has with its service providers and customers. All the contract templates stored in the contract repository 210 relate to the services provided by the underlying data service system of the service management system 100. The contract templates allow for validation of incoming contract verification requests from other data service systems or from the user terminals by customers and place constraints on what management data of the underlying data service system of the service management system 100 may be accessed from outside the domain as well as how that data is computed and presented. As described above, the validation process using the contract templates is done by the service manager 200.

The service manager 200 is also connected to a local measurement/management system 240 (hereinafter referred to as local system 240). The local system 240 provides all management data of the data service system within which the service management system 100 is located to the service manager 200. The local system 240 collects all the management data from the local infrastructure and applications of the underlying data service system of the service management system 100. Based on the management data collected, the local system 240 provides an abstract view of the underlying data service system to the service manager 200 that is independent of the underlying implementation. The service manager 200 uses software and/or hardware tools as means to obtain the management data and to provide the abstract view. These tools are referred to as plug-ins (i.e., the plug-ins 201 in FIG. 5). The plug-ins can be implemented by any known means.

In one embodiment, the plug-ins 201 of the service manager 200 are system-specific plug-ins that provide an abstract view of the system to the service manager 200 that is independent of the implementation of the underlying data service system. In this case, the service manager 200 uses this abstract view to compare the system behavior to the predetermined thresholds and conditions specified in the corresponding contract templates to monitor the SLAs for compliance. Because the plug-ins hide the details of the underlying data service system and the measurement protocols from the service manager 200, new measurements are easy to be added to the system. In this case, the service management system 100 can dynamically load measurement plug-ins as needed.

In another embodiment, the plug-ins 201 of the service manager 200 provide a view of the system to the service manager 200 that is dependent on the implementation of the underlying data service system. In this case, the service manager 200 may need to first convert the view into an abstract view that is independent of the underlying implementation using the system dependent data derived from the service model information of the underlying system. Alternatively, the service manager 200 may also apply the dependent view to an implementation-dependent contract template in order to monitor for the compliance.

Figure 7:
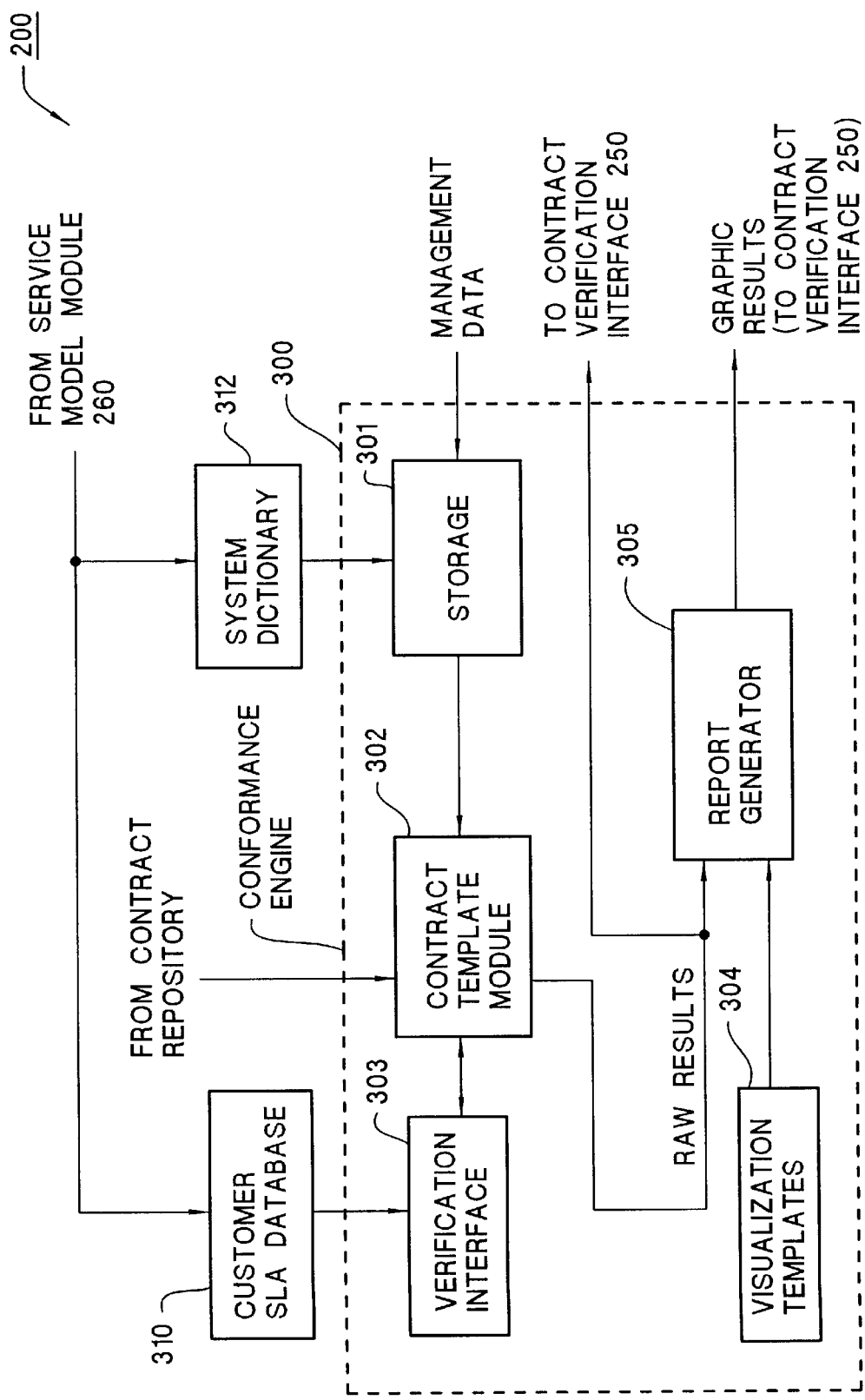
FIG. 7 shows the structure of the service manager of the service management system of FIG. 5.

To minimize measurement traffic, the measurements of the underlying data service system is cached in a system variable cache (shown in FIG. 7 as the storage 301). The cache provides a logical database view of the system (i.e., every system attribute is treated as an entry in a logical database, with the attribute name being used as the key to retrieve its current value). The cache can also store measurement history if needed to compute aggregated values.

The service manager 200 also receives management data from another data service system that provides data services to the data service system within which the service management system 100 is located. In this case, the service manager 200 receives the management data from the other data service system via the service management system of that data service system. Because the management data received by the service manager 200 also passes through the other data service system's service management system, the management data itself is a selective management data produced by the other data service system's service management system in accordance with the service level agreement between the two domains.

The service manager 200 is also connected to a service model module 260. The service model module 260 stores the service model information of the data service system within which the service management system 100 is located. As described above, the service model includes a description of the service that the data service system of the service management system 100 is managing as well as the dependencies between the service components of the underlying data service system. As described above, the service model information is converted into a customer dependent data and a system dependent data when supplied to the service manager 200. Alternatively, the service management system 100 functions without the service model module 260. In this case, the service manager 200 is dependent on the structure of the underlying data service system and needs to know the dependencies between the service components of the underlying data service system.

In addition, the service management system 100 further includes a contract verification interface 250 and an authentication and authorization module 230. The contract verification interface 250 is connected to the service manager 200 and the authentication and authorization module 230 is connected to the contract repository 210 and the contract verification interface 250. The contract verification interface 250 is the interface of the service management system 100 to other service management systems located in the other data service systems. All external interactions of the service management system 100 occur through the contract verification interface 250. The authentication and authorization module 230 identifies the contract template stored in the contract repository 210 for an incoming request received in the contract verification interface 250, and then notifies the contract verification interface 250 of its authentication result. The authentication and authorization module 230 can be implemented using known technologies.

The main purpose of the contract verification interface 250 is to perform various types of verification operations based on the compliance results supplied from the service manager 200. These operations include contract verification, event notification, problem reporting and monitoring. The contract verification interface 250 is implemented as an application programming interface that includes a number operations. They are:

Verify( )—This method verifies the contract between the customer and the service provider. The contents of the contracts are agreed upon prior to this verification request. The input parameters to this method are the customer identity and the contract name to be verified. This method returns a boolean value of whether or not a contract is in compliance.

Verify With Values( )—This method is similar to Verify( ) method. In addition to returning the boolean value, this method returns the values of all the assertions, and values of all service metrics.

Verify Assertions( )—This method allows the customer to verify a portion of the contract. The customer may choose to verify only a portion of the contract that may not be operating within bounds. This method returns a boolean value.

Verify Assertions With Values( )—This method is similar to Verify Assertions( ) method. In addition to returning a boolean value as a result of the selected assertions, this method returns all the dependent assertion values and the service metric values.

GetSystem Variable Value( )—This method allows the customer to get the value of one or more service metrics. For example, if a customer is interested in getting the value of the mail availability metric, this method will return its current value.

RegisterEvent( )—Customers can use this method to register interest in events. Events are also expressed as expressions. The bounds and thresholds used in these expressions may be different from what is used in the service guarantee contract. Customers have to provide a callback method as one of the input parameters to this method. The callback method will be invoked when that event happens.

NotifyEvent( )—When a registered event happens, this method notifies the customer of the event using the callback method that was provided by the RegisterEvent( ) method.

UnregisterEvent( )—Customers can choose to unregister in events they see are no longer necessary.

With Verify With Values( ), Verify Assertions With Values( ), and GetSystem Variable Value( ) methods, only the exported service metric values will be exposed. A provider domain may have additional details in the contract that are not exposed to the customer. Such information will not be shared with the customers.

Figure 6:
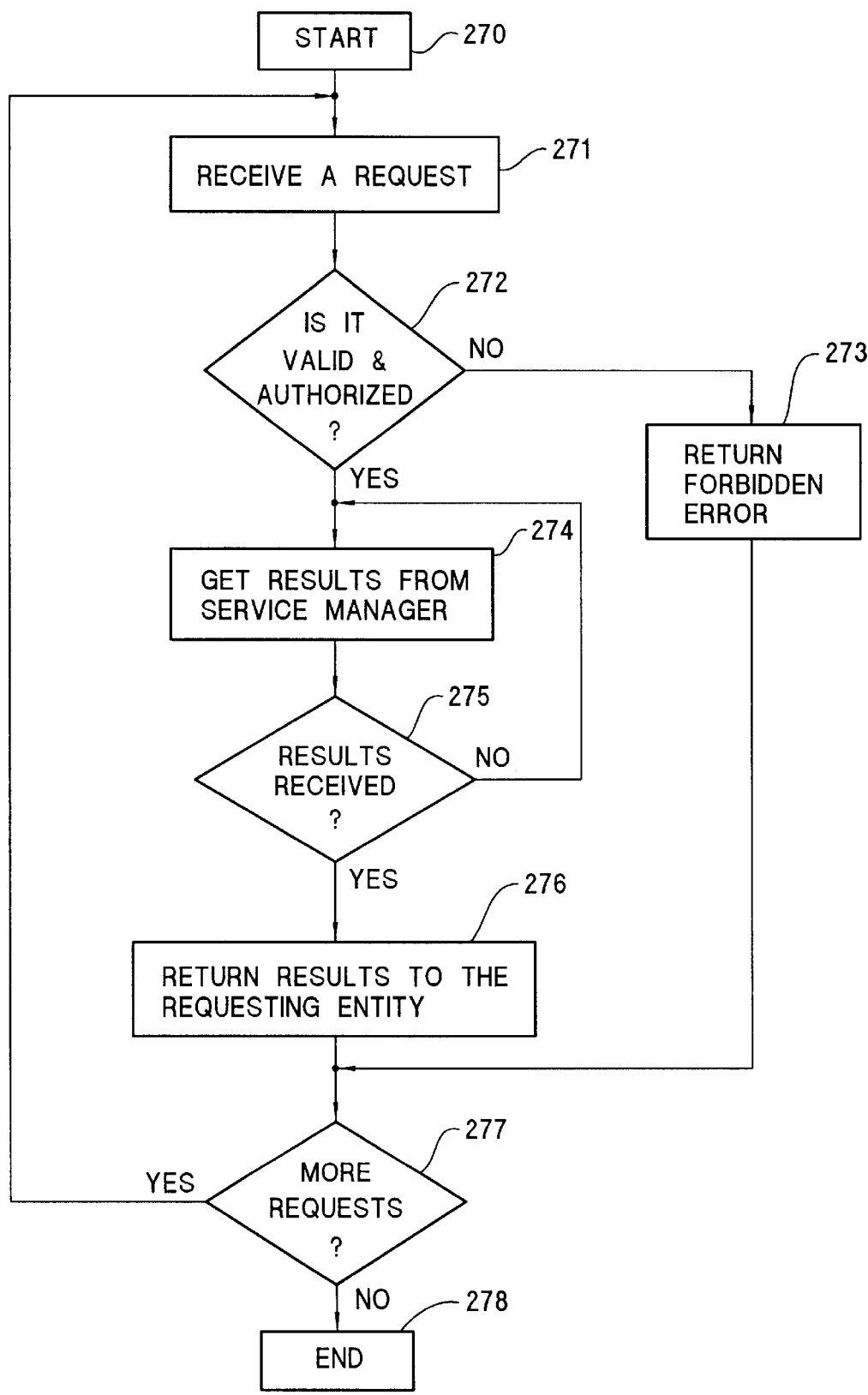
FIG. 6 shows in flow chart diagram form the verification process of the contract verification interface of the service management system of FIG. 5.

The above described APIs are examples only. Other APIs may also be used to provide similar functionality. FIG. 6 shows in flow chart diagram form the basic control flow of the contract verification interface 250, which will be described in more detail below.

FIG. 6 shows in flow chart diagram form the control flow of the contract verification interface 250 of FIG. 5. As can be seen from FIG. 6, the process starts at the step 270. At the step 271, a request for verification is received in the contract verification interface 250 of FIG. 5. At the step 272, the contract verification interface 250 determines whether the received request has been validated and authorized by the module 260 of FIG. 6. As can be seen from FIG. 5, the authentication and authorization module 260 accesses the contract repository 210 to search for or identify the corresponding contract template of the verification request, and then authenticates the request using the security parameters the identified contract template.

If, at the step 272, the answer is no, then the step 273 is performed at which a forbidden error is returned to the requesting system and the process moves to the step 277.

If, at the step 272, the answer is yes, then the step 274 is performed at which the contract verification interface 250 waits for the management data (i.e., the selective actual management data or verification result in the form of compliance or non-compliance in accordance with the SLA between the request entity and the underlying data service system of the service management system 100 of FIG. 5). At the step 275, the contract verification interface 250 determines if the results have been received. If no, then the step 274 is repeated. If so, the step 276 is performed, at which the received results are sent to the external requesting entity. At the step 277, it is determined if more requests are received in the contract verification interface 250. If so, the process returns to the step 271. If not, the process ends at the step 278.

FIG. 7 shows in more detail the structure of the service manager 200 of FIG. 5. As can be seen from FIG. 7, the service manager 200 includes a system dictionary 312 and a customer SLA database 310. The system dictionary 312 stores the system dependent data of the underlying data service system of the service manager 200. The system dependent data are converted into the machine code form before being stored in the system dictionary 312. The service manager 200 also includes a conformance engine 300 that includes a storage 301 for receiving the management data obtained from the local system 240 of FIG. 5 and from the other data service systems. The storage 301 is also connected to the system dictionary 312 to receive the system dependent data from the system dictionary 312. The system dependent data controls the storage 301 to receive the management data.

Figure 8:
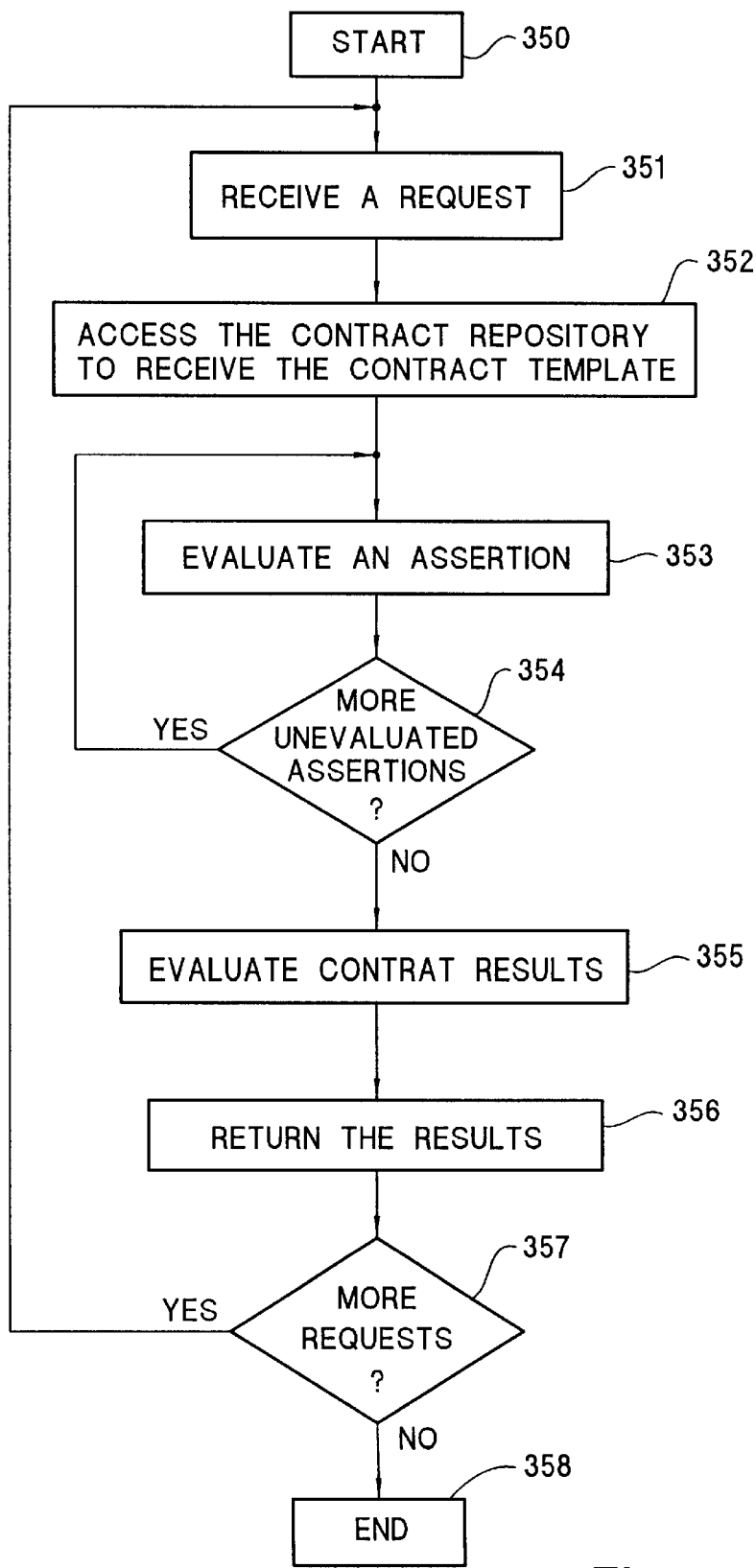
FIG. 8 shows in flow chart diagram form the filtering process of the contract template module of FIG. 7 for providing selective management data from all management data.

The conformance engine 300 also includes a contract template module 302 that is connected to the contract repository 210 of FIG. 5 to receive the contract template. The contract template module 302 is also connected to a verification interface 303. The verification interface 303 is also connected to the customer SLA database 310 to receive customer dependent or specific data. The verification interface 303 inserts the customer dependent data into the contract template in the contract template module 302. The contract template module 302 then computes the compliance results from the management data based on the customized contract template in the module 302. The compliance process of the contract template module 302 is shown in FIG. 8, which will be described in more detail below.

Figure 10:
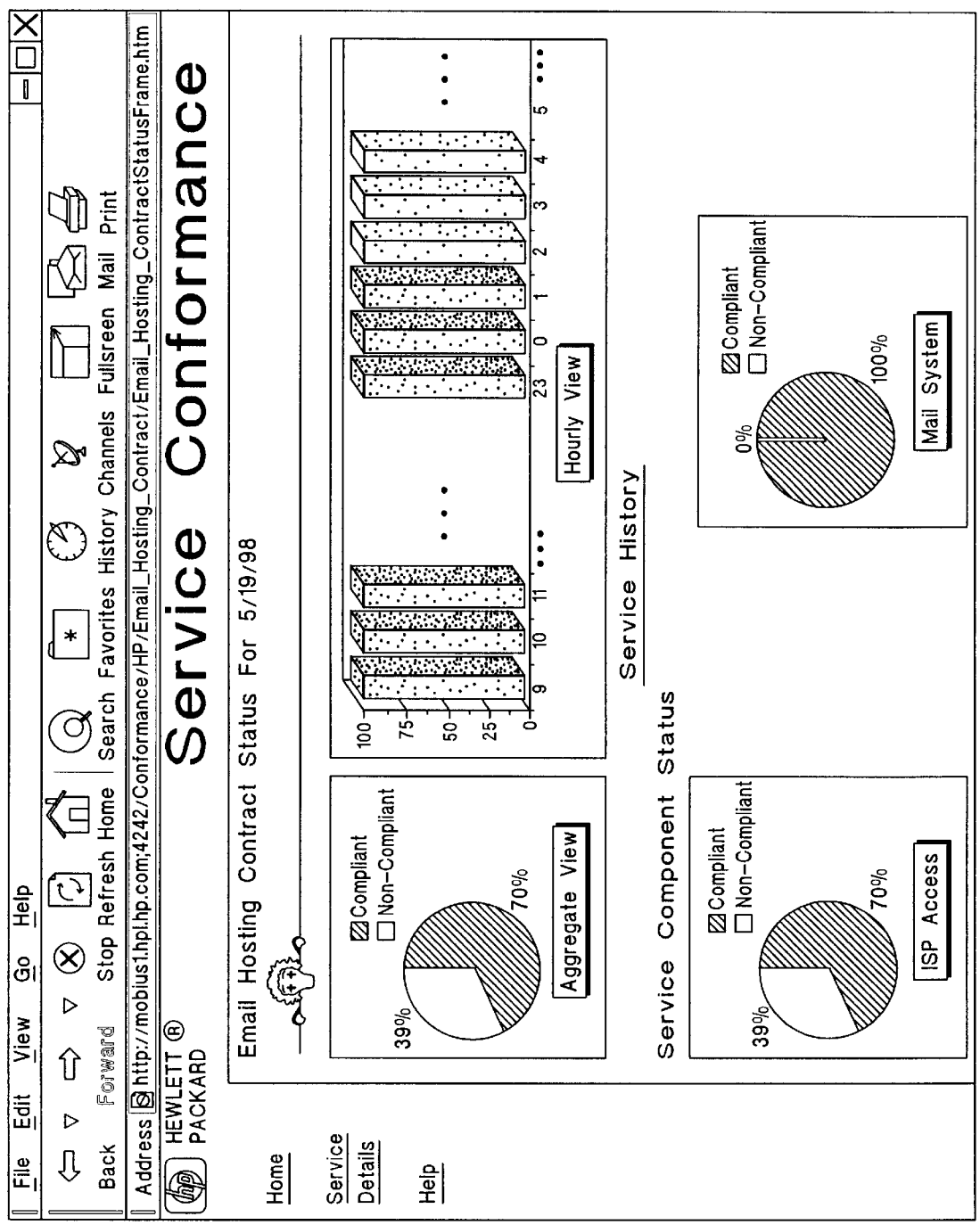
FIG. 10 is an example of the graphical report in a web page form that is generated by the service manager of FIG. 7.

The conformance engine 300 also includes a report generator 305 and a visualization templates module 304. The visualization templates module 304 supplies visualization templates to the report generator 305 so that the report generator 305 can generate graphic report. FIG. 10 shows an example of a graphic report in World Wide Web page form.

Referring now to FIGS. 5 and 7, the operation of the service management system 100 is described in more detail. During operation, when a request is received at the contract verification interface 250, the authentication and authorization module 230 validates the incoming request and identifies the corresponding contract template stored in the contract repository 210. Once the authentication and authorization module 230 validates the request, the contract verification interface 250 is notified and the corresponding contract template is loaded into the contract template module 302 of the service manager 200. As described above, each contract template contains the assertions in the corresponding contract specification as a directed acyclic graph.

The service manager 200 then loads from the customer SLA database 310 the customer dependent data into the verification interface 303. This is because the same contract could be offered to multiple customers, different customer-specific data need to be filled into the contract template at the contract evaluation time. This allows a template to be shared by multiple customers.

As described above, the customer dependent data are customer-specific data that describe the guarantees (thresholds, system parameters, and bounds on the attributes) as well as the service components that impact the service offered to a given customer. The verification interface 303 of the service manager 200 then causes the customer dependent data to be inserted into the contract template retrieved into the contract template module 302 of the service manager 200.

The contract template module 302 then causes the storage 301 of the service manager 200 to obtain the actual system management data of the underlying data service system from the plug-ins 201 (FIG. 5) in accordance with the system dependent data stored in the system dictionary 312 of the service manager 200. As described above, the management data are abstract or derived measurements computed from element level measurements. In other words, the system dependent data describe the abstract view of the service model in terms of high-level service attributes that are offered to customers. Examples are service availability, response time, throughput, utilization, etc.

Then the contract template is evaluated in the contract template module 302 by computing the values of the assertions defined in the contract template using the attribute values and customer-specific data (i.e., parameters, bounds, and thresholds). FIG. 8 shows in flow chart diagram form the evaluation process of the contract template module 302, which will be described in more detail below.

Referring back to FIGS. 5 and 7, the compliance results are then logged and communicated either programmatically to the contract verification interface 250 as raw results or through the report generator 305 to generate a graphic report using the visualization template provided by the module 304. The raw results are the selective management data of the underlying data service system or the selective management data of the underlying service (which may include the management data of another data service system). The graphic report is then sent to the contract verification interface 250.

The contract verification interface 250 then sends the results to the external requesting system. In addition, the contract verification interface 250 can further verify the results against the contract template from the contract repository 210 to obtain a simple compliance or noncompliance answer using one of its verification operations. Alternatively, the service management system 100 may function without the contract verification interface 250. As described above, the contract verification interface 250 can also be used to share other information between administrative domains.

Referring to FIG. 8, the compliance process of the contract template module 302 of FIG. 7 is shown in flow chart diagram form. The process starts at the step 350. At the step 351, the contract template module 302 receives the request. At the step 352, the contract template module 302 accesses the contract repository 210 to receive the associated contract template. At the step 353, the contract template module 302 performs the required evaluation on an assertion of the contract template. This also includes recording result of the evaluation. At the step 354, it is determined that the contract template contains unevaluated assertions. If so, the process returns to the step 353. If not, the step 355 is performed at which the contract results (i.e., the collective result of all the assertion results) are evaluated and produced. At the step 356, the final results are sent to either the report generator 305 or the contract verification interface 250. At the step 357, the module 302 determines if more requests for compliance processing are received. If so, the process returns to the step 351. Otherwise, the process ends at the step 358.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A service management system in a federated system having a first and a second independently administered data service systems, comprising:

a service manager located only inside the second data service system to allow the first data service system to access selective management data of the second data service system in accordance with a predetermined access agreement between the first and second data service systems without giving the first data service system complete access to the second data service system, wherein the service manager does not provide any broker operation to try to match agents together and the access agreement does not cause a contract to be negotiated, but rather specifies what management data of the second data service system can be received by the first data service system, wherein the management data do not specify interactions between the two service systems.

2. The service management system of claim 1, wherein the service manager further comprises a contract template module that receives a contract template derived from the predetermined access agreement to filter all the management data of the second data service system into the selective management data.

3. The service management system of claim 2, further comprising a contract repository that stores the contract template of the predetermined access agreement, wherein the contract repository is coupled to the contract template module of the service manager.

4. The service management system of claim 2, wherein the service manager further comprises a verification interface coupled to the contract template module to insert customer-specific thresholds, bounds, and system parameters specified by the predetermined access agreement into the contract template in the contract template module to produce the selective management data.

5. The service management system of claim 3, wherein the verification interface receives the customer-specific thresholds, bounds, and system parameters from a customer access agreement database.

6. The service management system of claim 1, further comprising a service model module coupled to the service manager to provide a description of services provided by the second data service system to the service manager.

7. The service management system of claim 6, wherein the service manager also uses the description of services of the second data service system from the service model module to produce the selective management data.

8. The service management system of claim 1, wherein the service manager receives all the management data either from a local management system of the second data service system, or from the local management system and another service management system in a third data service system coupled to the second data service system.

9. The service management system of claim 1, further comprising a contract verification interface coupled to the service manager to verify if the second data service system is meeting its service obligations agreed to in accordance with the predetermined access agreement between the first and second data service systems based on the selective management data.

* * * * *